United States Patent [19]

Park

[11] Patent Number: 4,722,972

[45] Date of Patent: Feb. 2, 1988

[54] FOAMS OF IONICALLY ASSOCIATED BLENDS OF STYRENIC AND ETHYLENIC POLYMERS

[75] Inventor: Chung P. Park, Pickerington, Ohio

[73] Assignee: The Dow Chemical Company, Midland, Mich.

[21] Appl. No.: 827,706

[22] Filed: Feb. 10, 1986

Related U.S. Application Data

[62] Division of Ser. No. 792,665, Oct. 29, 1985, Pat. No. 4,623,671.

[51] Int. Cl.$^4$ .............................................. C08L 33/02
[52] U.S. Cl. .................................... 525/221; 521/94; 521/134; 521/143; 521/146; 525/196
[58] Field of Search ................................ 525/196, 221

[56] References Cited

U.S. PATENT DOCUMENTS 3,437,718  4/1969  Rees ..................................... 525/196

Primary Examiner—Morton Foelak

[57] ABSTRACT

Novel foamed thermoplastic resins are disclosed. The foam includes an ionically associated blend containing at least about 60 weight % of a metal salt of a styrene-acrylic acid copolymer and at least 1 weight % of a metal salt of an ethylene-acrylic acid copolymer. The foams typically are prepared by extruding a ternary mixture of a styrene-acrylic acid copolymer, an ethylene-acrylic copolymer and an alkali metal bicarbonate which functions as the foaming agent. The ionically associated blends included in the foam are believed to be novel compositions of matter.

3 Claims, No Drawings

FOAMS OF IONICALLY ASSOCIATED BLENDS OF STYRENIC AND ETHYLENIC POLYMERS

CROSS-REFERENCE TO RELATED APPLICATION

This is a divisional of application Ser. No. 792,665, filed Oct. 29, 1985, now U.S. Pat. No. 4,623,671.

BACKGROUND OF THE INVENTION

Styrene polymer foams by reason of their relatively low cost and low density are used in large volume as insulating and packaging materials. While such foams are widely used, it is recognized that they are subject to shortcomings which limit their use in certain applications. Such foams, particularly at low densities, have little physical strength and tend to be quite brittle.

In application Ser. No. 588,470, filed Mar. 12, 1984, now U.S. Pat. No. 4,532,265 the present applicant has disclosed that styrene polymer foams having higher softening points and lower melt viscosities can be prepared by extruding styrene-acrylic acid in admixture with sodium bicarbonate which functions as a foaming agent. The extrusion process converts the styrene-acrylic acid polymer to its sodium salt. While this styrene polymer foam is superior to styrene homopolymer foams for certain purposes, this novel foam is undesirably brittle. For this reason, it is difficult to continuously produce such a styrene polymer foam in sheet form by blown film extrusion processes.

For the above reasons, there is a need in the art for improved styrene polymer foams and economically attractive processes for preparing foamed sheet therefrom by blown film extrusion processes.

SUMMARY OF THE INVENTION

The present invention is directed to improved polymer foams of ionically associated blends containing at least about 60 weight % of an ionic styrenic polymer and at least about 1 weight % of an ionic ethylenic polymer. The ionic styrenic polymer is a metal salt of a polymer having polymerized therein styrene or a ring alkyl-substituted styrene and an ethylenically unsaturated acid monomer polymerizable therewith. The ionic ethylenic polymer is a metal salt of a polymer having polymerized therein ethylene and an ethylenically unsaturated acid monomer polymerizable therewith. The invention also is directed to a process for preparing such foams by extruding ternary mixtures of a styrene-acid copolymer, an ethylene-acid copolymer, and a metal bicarbonate which functions as the foaming agent. Both the foamable resin compositions employed in the foam extrusion process and the ionically associated blends included in the foams are believed to be new compositions of matter.

DETAILED DESCRIPTION OF THE INVENTION

In the broadest embodiment of the invention, the foams will contain at least 60 weight % of an ionic styrenic polymer and at least 1 weight % of an ionic ethylenic polymer. The foams customarily will contain only the above noted two polymeric components. With such binary compositions, the ionic styrenic polymer will constitute about 60–99, preferably 80–97, and most especially about 90–96 weight % of the foam with the ethylenic polymer correspondingly constituting about 1–40, preferably 3–20, and more especially about 4–10 weight % of the foam. If desired for special purposes, minor amounts of third polymer species can be included in the foams. Such third polymer species must be selected carefully and used in sufficiently small concentrations so that the foams retain their homogeneity and desired physical properties. Examples of third polymer species that can be included in the foams are polystyrene, the polymerized vinyl toluenes, styrene-butadiene block copolymers, hydrogenated styrene-butadiene block copolymers, and styrene-ethylene block copolymers.

The ionic styrenic polymers included in the foams of the invention are metal salts of a copolymer having polymerized therein about 70 weight % of styrene or an alkyl-substituted styrene and about 1–30 weight % of an ethylenically unsaturated acid polymerizable with the styrene monomer. The styrene monomer included in the styrenic polymer preferably is styrene itself, i.e., vinyl benzene, but various ring alkyl-substituted styrenes may be employed as a partial or total replacement for styrene, examples of suitable monomers of this type being the isomeric vinyl toluenes, the isomeric vinyl ethylbenzenes, the isomeric vinyl dimethylbenzenes and the like. The ethylenic unsaturated acid to be employed in the styrenic polymers preferably is acrylic acid or methacrylic acid. Other acids which can be employed include ethacrylic acid, itaconic acid, the half esters of fumaric and maleic acids and the like. The preferred binary styrenic polymers will contain 70–99, preferably 80–97, and more especially 85–95 weight % of the styrenic monomer and correspondingly 1–30, preferably 3–20, and more especially 5–15 weight % of the acid monomer. Third monomers can be employed as a partial replacement for the styrenic monomer in the styrenic polymers, such third monomers preferably being alpha-methylstyrene or a polar monomer, such as acyrlonitrile, the various acrylate and methacrylate esters, and the like.

The styrenic polymers can be prepared by techniques well known in the art. The styrenic polymers preferably will have weight average molecular weights greater than about 50,000, and more especially, greater than about 150,00. The styrenic polymers can be converted to their metal salts by reaction with suitable metal salts, oxides and bases. The preferred cations to be included in the ionic styrenic polymers are alkali metal ions. Certain divalent and trivalent metal ions also can be employed for this purpose, particularly magnesium, zinc and aluminum ions. In some applications, the ammonium ion can be used in lieu of a metal ion. Most conveniently, the styrenic polymers are converted to their alkali metal salts by the extrusion foaming process discussed infra.

The ionic ethylenic polymers are metal salts of copolymers having polymerized therein at least about 60 weight % ethylene and 1–40 weight % of an ethylenically unsaturated acid polymerizable with ethylene. The ethylenically unsaturated acid included in the ethylenic polymer preferably is acrylic acid or methacrylic acid. Other acids which can be included in the ethylenic polymer include ethacrylic acid, itaconic acid, the half esters of fumaric and maleic acids, and the like. When the ethylenic polymer is a binary polymer, it will contain 60–99, preferably 80–97, and more especially 85–95 weight % polymerized ethylene and correspondingly 1–40, preferably 3–20, and more especially 5–15 weight % of the polymerized acid monomer. Third monomers can be included in the ethylenic polymer as a partial replacement for ethylene. Where employed, such third monomers are preferably polar monomers, such as vinyl acetate, the various acrylate and methacrylate esters, acrylonitrile, and the like. The ethylenic polymers can be prepared by techniques well known in the art. The ethylenic polymers preferably will have normal load melt indexes (ASTM D-1238-79 Condition E) of less than about 2,000, preferably less than about 500 and especially less than about 50. The ethylenic polymers can be converted to their metal salts by reaction with certain metal salts, oxides and bases by procedures disclosed in U.S. Pat. No. 3,404,134. The preferred cations to be included in the ionic ethylenic polymers are alkali metal ions. Certain divalent and trivalent metal ions also can be employed, particularly zinc. The ionic ethylenic polymers also can be prepared by saponification of ethylene-acrylate and methacrylate ester copolymers in aqueous media as disclosed in U.S Pat. No. 3,970,626.

The polymer foams of the invention preferably are prepared by extruding a foamable composition which is a ternary mixture of a sytrenic polymer, an ethylenic polymer and a metal bicarbonate, such as an alkali metal, magnesium or zinc bicarbonate. The foamable resin composition will contain 1–20, preferably 3–12, and more especially 5–10 parts by weight of the metal bicarbonate for each 100 parts by weight of the polymeric components. The polymeric components in the total amount of 100 parts by weight will be included in the proportion of the styrenic polymer and the ethylenic polymer noted supra. The three components of the foamable composition will be comminuted into fine particles and dry blended to form an intimate physical admixture of the three components. It is desirable, although not mandatory, to include up to about 1 weight % water in the foamable composition to assist in the promotion of the reaction which takes place between the acid groups of the styrenic and ethylenic polymers with the bicarbonate and its decomposition products during the foaming process to form the metal salts of the styrenic and ethylenic polymers.

The extrusion of the foamable compositions can be carried out in conventional unmodified extruders to form logs or planks of the foam or to form relatively thin sheets of the foam employing conventional blown film extrusion apparatus and techniques. By suitable control of the metal bicarbonate content and the extrusion conditions, particularly temperature, it is possible to prepare foams having densities over a wide range, such as from about 1 to 30 lbs./ft$^3$.

The extrusion process described supra can be supplemented by extruding the foamable resin compositions in extruders provided with means for injecting vaporizable organic liquids, such as the chlorofluoroalkanes and/or alkanes, such as pentane, directly into the polymer melt. General techniques for carrying out such extrusion processes are set forth in the applicant's application Ser. No. 588,470, filed Mar. 12, 1984, which descriptions are incorporated herein by reference. If desired, the blends of the salts of the styrenic and ethylenic polymers can be foamed by the sole use of volatile foaming agents, such as the chlorofluoroalkanes and alkanes.

The following examples are set forth to illustrate the principles and practice of this invention to those skilled in the art. Where parts or percentages are mentioned, they are parts of percentages on a weight basis, unless otherwise indicated.

EXAMPLE 1

A foamable resin composition was prepared by dry blending 95 parts by weight of a styrene-acrylic acid copolymer, 5 parts by weight of an ethylene-methacrylic acid-isobutyl acrylate terpolymer and 5 parts by weight of sodium bicarbonate. Both of the polymers were comminuted to a 3 mm mesh size and about 0.45 part of weight of a wetting agent solution was added to assist in preparing the intimate physical admixture. The styrene-acrylic acid copolymer contained 8 weight % acrylic acid, 92 weight % styrene and had a weight average molecular weight of about 210,000. The ethylene-methacrylic acid-isobutyl acrylate terpolymer was a commercially available polymer having a 35 melt index and a density of 0.939 gm./ml. It was estimated to contain about 10 weight % methacrylic acid, 10 weight % isobutyl acrylate and the balance ethylene.

Part B

The composition of Part A was extruded into blown foamed film having a thickness of about 18 mils. The apparatus employed was a conventional blown film extrusion line consisting of an extruder having a one inch screw diameter, a circular annulus die facing upward, a set of pinch rollers, guide rollers and a winding roller. The extruder had conventional temperature-controlled sequential zones consisting of a feeding zone, a melting zone and a metering zone. The extruder zones were maintained at temperatures of about 180° and 200° C., respectively. The die temperature was maintained at about 200° C.

The foam was produced at a steady rate and did not crack at the pinch rolls. The foam was easily conducted away through the guide rollers and wound upon the winder. The foam had a density of 11.3 lbs./ft$^3$, had an average cell size diameter of 1.08 mm as determined by ASTM D-3576. The toughness of the foam in the machine direction was 168 psi. The toughness of the foam in the cross direction was 103 psi. For the purposes of this application, toughness as reported is one-half of the product of the foam's tensile strength and elongation.

EXAMPLE 2

Part A

As a first prior art control, a foamable resin composition was prepared by dry blending 100 parts of the styrene-acrylic acid copolymer employed in Example 1 with 5 parts of the same sodium bicarbonate employed in Example 1. The dry blending of the polymer and sodium bicarbonate also was assisted by the inclusion of approximately 0.45 weight % of the same wetting agent solution employed in Example 1.

Part B

The foamable resin composition of Part A above was extruded as a blown foam film employing the same apparatus and techniques described in Example 1, Part B. A good foam was produced, but the foam tube cracked at the edges when pinched at the pinch rollers, thus losing air. Thus, it was not possible to produce foam sheet continuously on this blown film line. The foam produced had a foam thickness of 27 mils. and had a foam density of 7.56 lbs./ft$^3$. The cell size in millimeters as determined by ASTM D-3576 was 0.90. The toughness of the film in the machine direction was 131 psi, while the toughness of the film in the cross direction was 71 psi. It will be noted that the toughness values were significantly lower than the toughness values obtained with the foam of the invention as reported in Example 1, Part B.

EXAMPLE 3

As a second prior art control, a foamable resin composition was prepared as in Example 2, Part A, except that the sodium bicarbonate level was reduced to 2 parts per 100 parts of the polymer components to produce a foam having a higher density more comparable to the density obtained with the product of the invention reported in Example 1, Part B. This foamable composition was extruded in the same manner as set forth in Example 2, Part B. It was again noted that the foamed resin frequently cracked in passage through the pinch rolls so that air was lost from the bubble. The resulting foam had a density of 12.2 lbs./ft$^3$ and had a cell size of 1.16 mm as measured by ASTM D-3576. The toughness values of this film were materially lower than the values obtained in both Examples 1 and 2. The toughness value in the machine direction was 62 psi, with the toughness value in the cross direction being 34 psi.

While the processes and products herein described constitute preferred embodiments of the invention, it is to be understood that the invention is not limited to these precise processes and products, and that changes may be made therein without departing from the scope of the invention which is defined in the appended claims.

What is claimed is:

1. An ionically associated blend of a styrenic polymer and an ethylenic polymer which comprises:
    (a) at least about 60 weight % of an ionic styrenic polymer; and
    (b) at least about 1 weight % of an ionic ethylenic polymer;

said ionic styrenic polymer being a ammonium salt of a polymer having polymerized therein at least about 70 weight % of styrene or a right alkyl-substituted styrene and about 1–30 weight % of an ethylenically unsaturated acid monomer polymerizable therewith; said ethylenic polymer being a ammonium salt of a polymer having polymerized therein at least about 60 weight % ethylene and about 1–40 weight % of an ethylenically unsaturated acid monomer polymerizable therewith.

2. A blend of claim 1 in which both the styrenic polymer and the ethylenic polymer have polymerized therein about 3–20 weight % of the ethylenically unsaturated acid monomer.

3. A blend of claim 2 in which the ethylenically unsaturated acid monomer polymerized in both the styrenic and ethylenic polymer is acrylic acid or methacrylic acid.

* * * * *

UNITED STATES PATENT AND TRADEMARK OFFICE
CERTIFICATE OF CORRECTION

PATENT NO. : 4,722,972
DATED : February 2, 1988
INVENTOR(S) : Chung P. Park

It is certified that error appears in the above-identified patent and that said Letters Patent is hereby corrected as shown below:

Col. 2, line 44, "150,00." should read --150,000.--.

Col. 3, line 66, delete the word "of" and insert therefore --or--.

Col. 4, line 2, following the word "EXAMPLE 1" insert therefore a paragraph return and --Part A--.

Col. 6, line 12, delete the word "right" and insert therefore --ring--.

Signed and Sealed this

Fourth Day of October, 1988

Attest:

DONALD J. QUIGG

Attesting Officer

Commissioner of Patents and Trademarks